US008605316B2

United States Patent
Mori

(10) Patent No.: US 8,605,316 B2
(45) Date of Patent: Dec. 10, 2013

(54) INFORMATION PROCESSING APPARATUS AND CONTROL METHOD THEREOF, AND STORAGE MEDIUM

(75) Inventor: Yasuo Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/107,693

(22) Filed: May 13, 2011

(65) Prior Publication Data

US 2011/0279862 A1  Nov. 17, 2011

(30) Foreign Application Priority Data

May 17, 2010  (JP) ................................. 2010-113559

(51) Int. Cl.
*G06K 15/02* (2006.01)

(52) U.S. Cl.
USPC ........................... 358/1.15; 358/1.1; 358/1.13

(58) Field of Classification Search
USPC ................................................. 358/1.15, 1.1
See application file for complete search history.

(56) References Cited

U.S. PATENT DOCUMENTS

| 6,757,070 B1 | 6/2004 | Lin et al. |
| 2009/0225346 A1* | 9/2009 | Tokuda ........................ 358/1.13 |
| 2009/0316187 A1 | 12/2009 | Kajikawa |

FOREIGN PATENT DOCUMENTS

| CN | 1499352 A | 5/2004 |
| CN | 1506800 A | 6/2004 |
| EP | 1026578 A2 | 8/2000 |
| JP | 2000-298569 A | 10/2000 |
| JP | 2005-301613 A | 10/2005 |
| JP | 2009-217331 A | 9/2009 |

* cited by examiner

*Primary Examiner* — King Poon
*Assistant Examiner* — Andrew H Lam
(74) *Attorney, Agent, or Firm* — Canon USA Inc. IP Division

(57) ABSTRACT

In a document processing method for performing print setting in cooperation with a job management server, if it is determined that a starting mode of a setting program is a cooperation mode for processing a print job in cooperation with a server apparatus, a setting screen is displayed based on the identification information of the print job to be processed and the initial setting information of the print job, and if it is determined that the starting mode is not the cooperation mode, the setting screen is displayed based on setting information for starting a setting program.

12 Claims, 13 Drawing Sheets

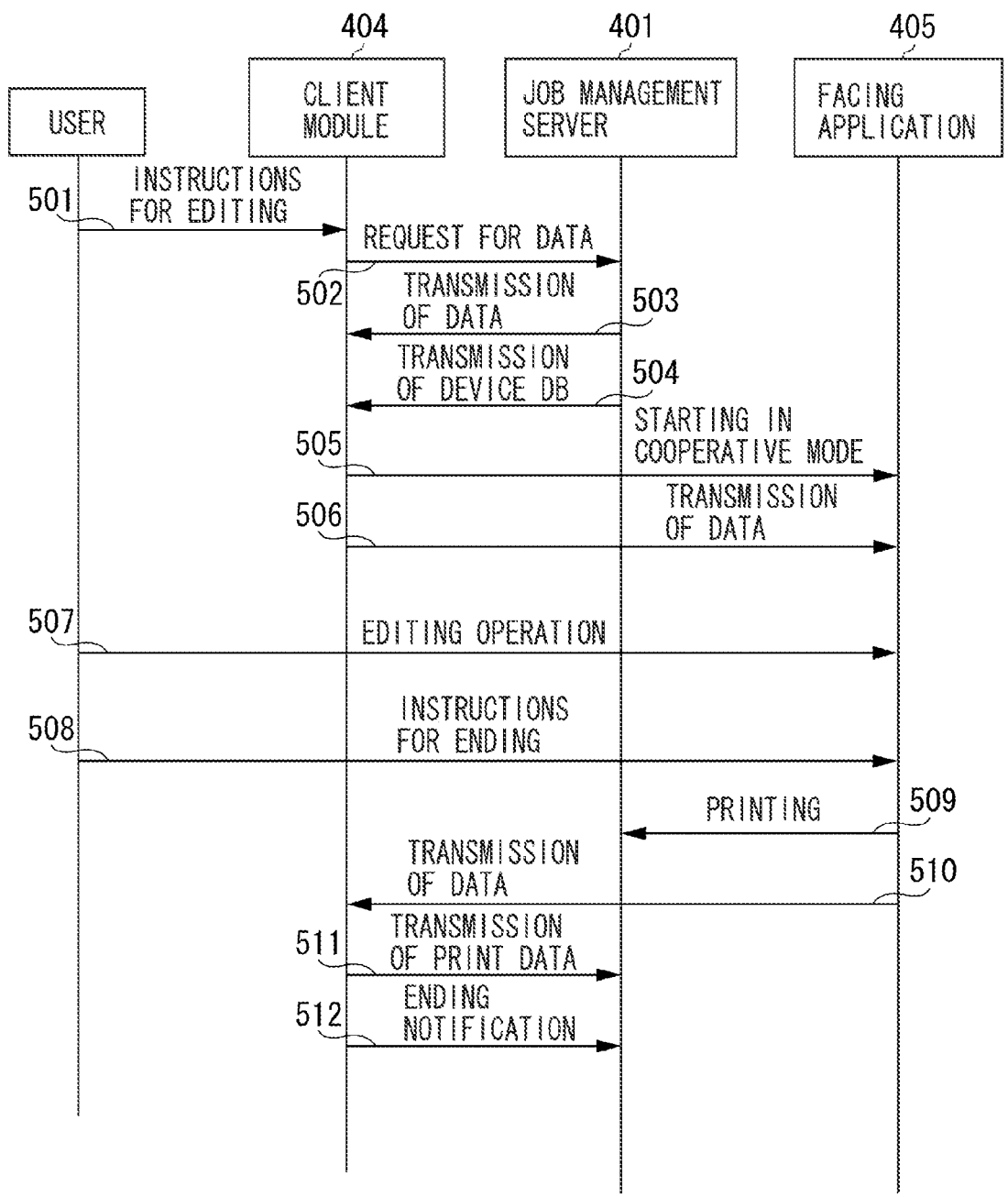

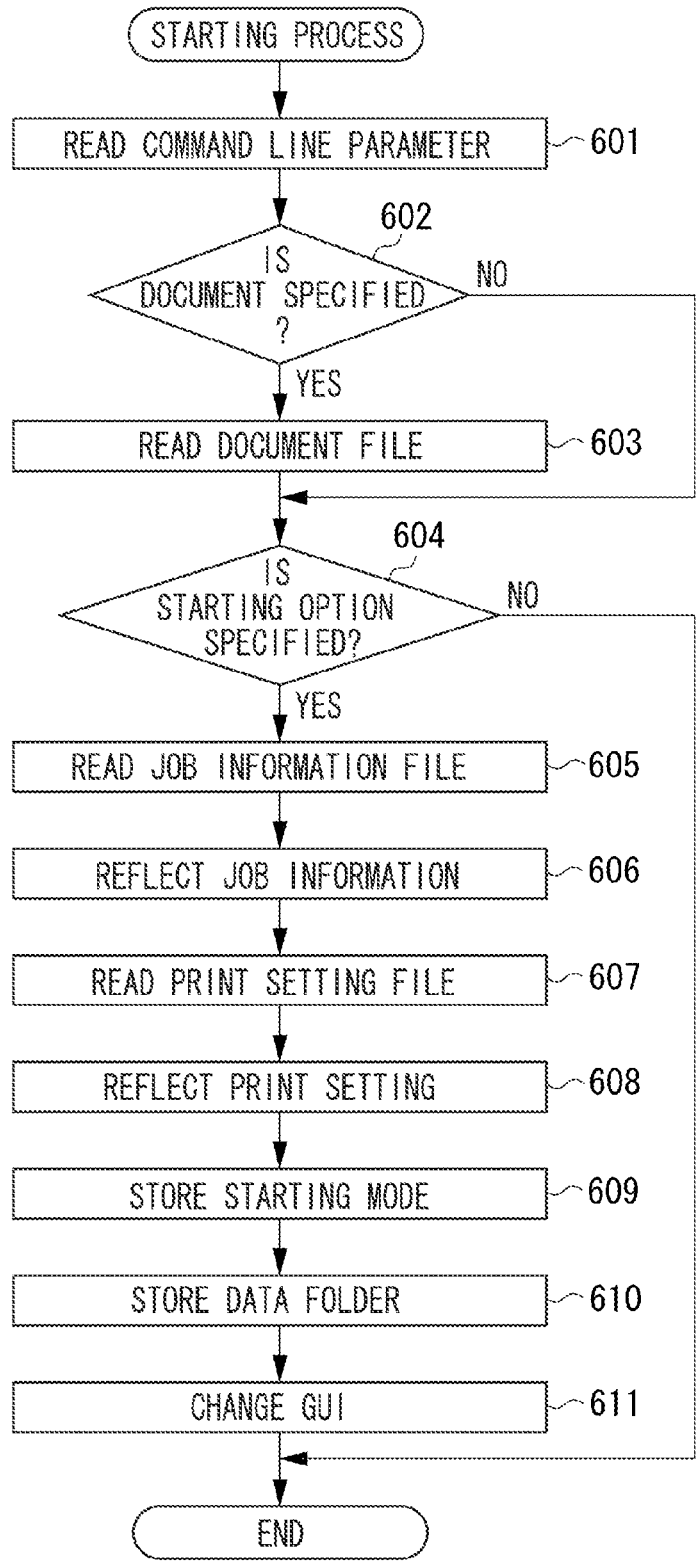

FIG. 8A

```
<Link version="2.00">
    <PrinterInfo ModelName="\\ServerPC\XXXXPrinter" PrinterType="1"/>    ~901
    <FileInfo>
        <File Type="JT-XML" Name="aaaaaa.jt"/>    ~902
        <File Type="PDF" Name="bbbbbb.pdf"/>    ~903
    </FileInfo>
</Link>
```

FIG. 8B

```
<Link version="2.00">
    <PrinterInfo ModelName="\\ServerPC\XXXXVirtualPrinter" PrinterType="2"/>    904
    <FileInfo>
        <File Type="IWD" Name="aaaaaa.iwd"/>    ~905
    </FileInfo>
</Link>
```

FIG. 9A

```
<Link version="2.00">
   <PrinterInfo ModelName="\\ServerPC\XXXXPrinter" PrinterType="1"/>
   <FileInfo>
       <File Type="IWD" Name="aaaaaa.iwd"/>   ~1001
   </FileInfo>
   <ReturnCode Value="0" />   ~1002
   </Link>
```

```
<Link version="2.00">
   <PrinterInfo ModelName="\\ServerPC\XXXXVirtualPrinter" PrinterType="2"/>
   <FileInfo>
   </FileInfo>
   <ReturnCode Value="2000" />   ~1003
   </Link>
```

```
<Link version="2.00">
   <PrinterInfo ModelName="\\ServerPC\XXXXPrinter" PrinterType="1"/>
   <FileInfo>
   </FileInfo>
   <ReturnCode Value="-1010" />   ~1004
</Link>
```

1000

INFORMATION PROCESSING APPARATUS AND CONTROL METHOD THEREOF, AND STORAGE MEDIUM

BACKGROUND OF THE INVENTION

1. Field of the Invention

The present invention relates to a method for operating with a job management server and setting print setting information.

2. Description of the Related Art

In a conventional document processing method, the display/non-display of a GUI (Graphical User Interface) and setting which can be set are limited based on read print setting information. Specifically, an available process (function) as well as an item to be displayed on a user interface are determined with reference to the limited information. Japanese Patent Application Laid-Open No. 2005-301613 discusses a technique in which a printer driver corresponding to a color printer for example is displayed as a driver that is under color limitations, thereby displaying a setting screen whereby a user is not caused to select color. However, in a case where a program for setting the print setting information is started alone or in collaboration with the job management server, it is required to switch control depending on a starting method. In a case where the program is started in collaboration with the job management server, the program needs to read initial values required for collaboration (such as a job ID (identifier), print setting, and an output printer) and to be started reflecting the read initial values. In a case where the program is started alone, however, there is no need for performing the process required for the collaboration.

SUMMARY OF THE INVENTION

The present application is directed to provide a technique for switching to an appropriate process by a starting method.

According an aspect of the present invention, an information processing apparatus which can communicate with a server for managing document data and stores a setting program for setting print setting information in the document data includes a determination unit configured to determine whether a starting mode of the setting program is a cooperation mode for processing the document data stored in the server and a control unit configured to operate in a state where a name of the document data cannot be changed if the determination unit determines that the starting mode is the cooperation mode and operate in a state where the name of the document data can be changed if the determination unit determines that the starting mode is not the cooperation mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a sequence diagram showing the outline of processing of the document processing system according to the present exemplary embodiment.

FIG. 5 is a flow chart showing an example of processing at startup of the imposition application.

FIGS. 8A and 8B illustrate examples of the job setting file.

FIGS. 9A, 9B, and 9C illustrate examples of status files.

DESCRIPTION OF THE EMBODIMENTS

Various exemplary embodiments, features, and aspects of the invention will be described in detail below with reference to the drawings.

The outline of a document processing system according to a first exemplary embodiment of the present invention is described below with reference to FIGS. 1 to 4. In the present exemplary embodiment, a job management server, a client module, and an imposition application are separately illustrated to clarify their respective functions, however, an installed package provided for a user is not limited to those. For example, the document processing system may be configured by an application or a system in which those are combined with one another. The detail of the document processing system is described below.

Figure 1:
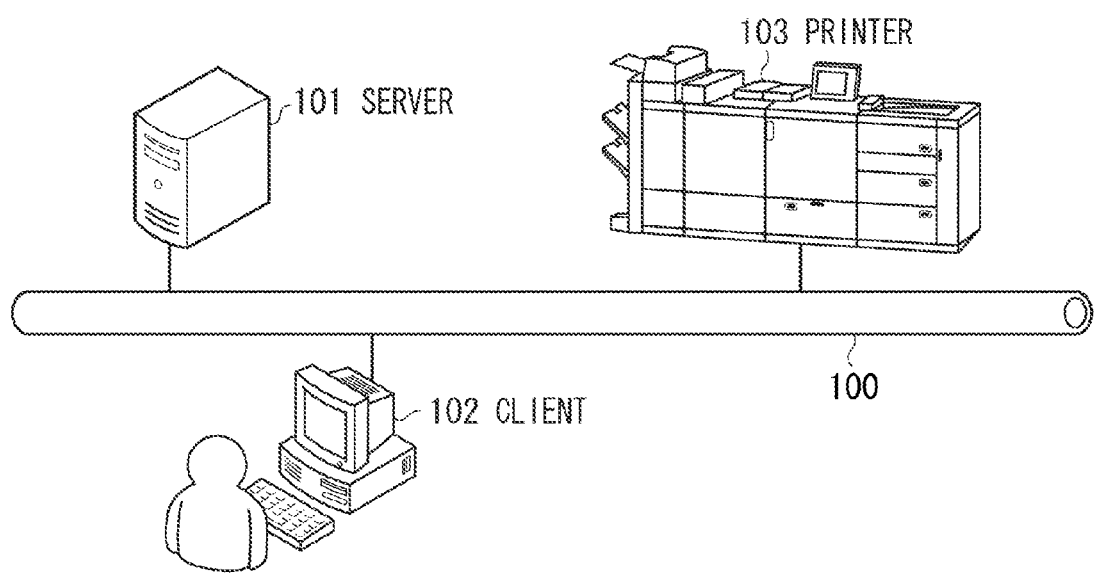
FIG. 1 is a schematic diagram illustrating a configuration of a network for a document processing system according to the present exemplary embodiment.

FIG. 1 is a schematic diagram illustrating a configuration of a network for the document processing system according to the present exemplary embodiment.

A server 101, a client 102, and a printer 103 are connected to a network 100. Programs such as a job management server program and a web server described later are operated on the server 101. A printer driver for controlling the printer 103 is installed on the server 101. In FIG. 1, although the client 102 and the printer 103 are single, a plurality of clients 102 and printers 103 may also be provided. The network 100 may be the Internet, for example, the client 102 may access the server 101 over the Internet.

Figure 2:
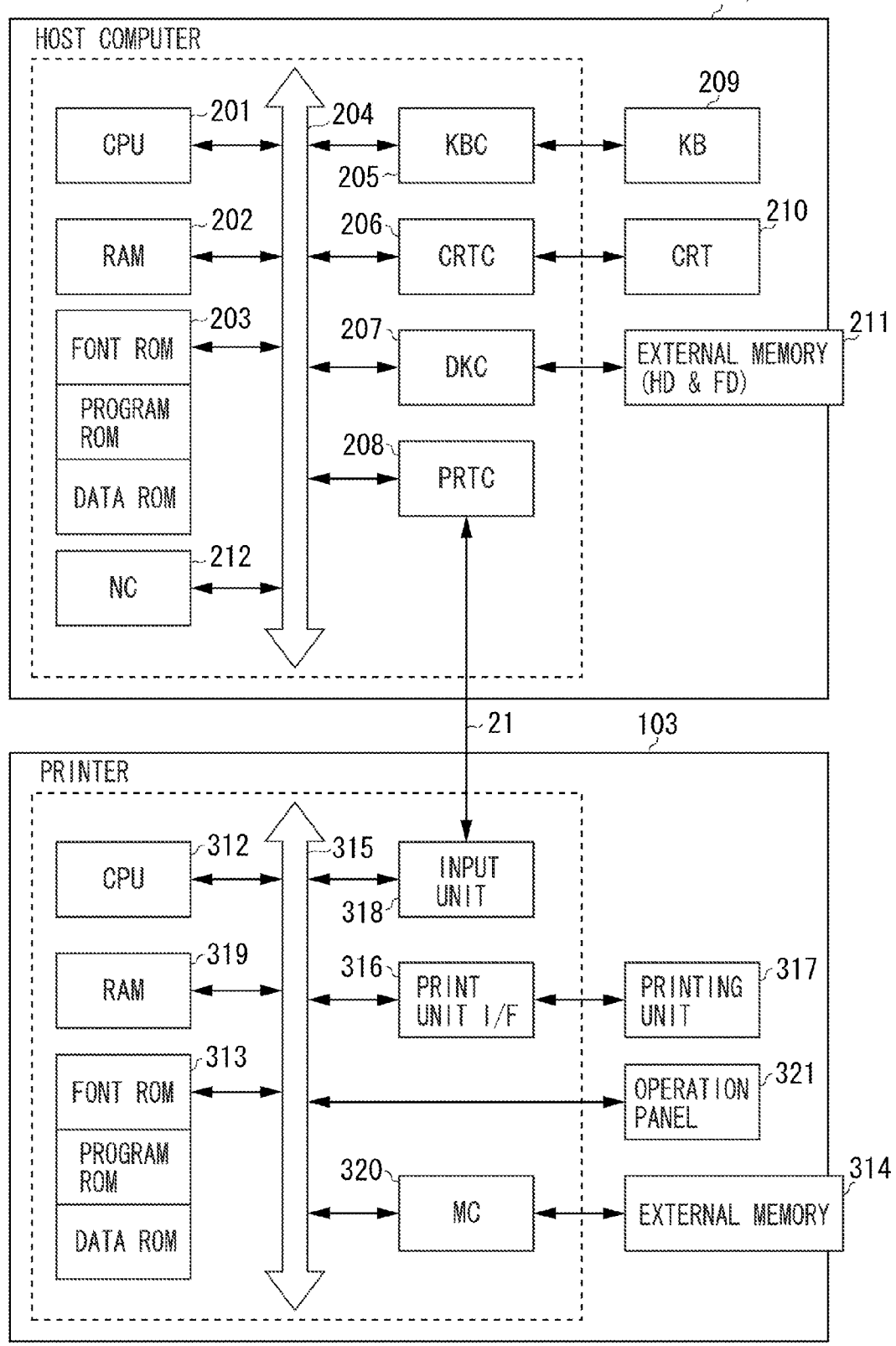
FIG. 2 is a block diagram illustrating a configuration of hardware for the document processing system according to the present exemplary embodiment.

FIG. 2 is a block diagram illustrating a configuration of hardware for the document processing system according to the present exemplary embodiment. The server 101 and the client 102 are similar in configuration, so that both are generically named an information processing apparatus (hereinafter referred to as a host computer 101) in FIG. 2.

The host computer 101 includes a CPU (Central Processing Unit) 201 for processing documents including a figure, an image, a character, and a table (a spread sheet and others) based on a document processing program stored in a ROM (Read Only Memory) for a program within a ROM 203 or an external memory 211. The CPU 201 generally controls each device connected to the system bus 204. The ROM for a program within the ROM 203 or the external memory 211 stores an operating system program, which is the control program of the CPU 201. The ROM for a program within the ROM 203 or the external memory 211 stores font data used for the document processing. The ROM for a program in the ROM 203 or the external memory 211 stores various data used for the document processing. A RAM (Random Access Memory) 202 functions as a main memory and a work area of the CPU 201.

A KBC (Keyboard Controller) 205 controls key input from a key board 209 or a pointing device (not illustrated). A CRTC (Cathode Ray Tube Controller) 206 controls the display of a CRT display 210. A DKC (Disk Controller) 207 controls access to an HD (Hard Disk) for storing various applications, font data, and a printer control command generation program, and the external memory 211 such as an FD (Floppy® Disk). The printer control command generation program refers to an example of the printer driver. A PRTC (Printer Controller) 208 is connected to the printer 103 via a bidirectional interface (interface) 21 and executes communication control processing between the interface 21 and the printer 103. An NC (Network Card) 212 is connected to the network and executes communication control processing between other devices connected to the network.

The CPU 201, for example, executes rasterizing of an outline font on a display information RAM set on the RAM 202 to make WYSIWYG possible on the CRT 210. The CPU 201 opens various registered windows based on the command specified by a mouse or a cursor (not illustrated) on the CRT 210 to execute various data processing. When the user executes printing, the user can open a window related to print setting and set a print processing method to the printer driver including the setting of the printer and the selection of printing mode.

The printer 103 is controlled by the CPU 312. The CPU 312 outputs an image signal as output information to an printing unit (a printer engine) 317 connected to a system bus 315 based on a control program stored in the ROM for a program within a ROM 313 or a control program stored in an external memory 314. The ROM for a program in the ROM 313 stores the control program of the CPU 312. A ROM for a font stores font data used for generating the output information. A ROM for data in the ROM 313 stores information used on the host computer 101 if a printer is not provided with the external memory 314 such as a hard disk.

The CPU 312 can communicate with the host computer 101 via an input unit 318 and can notify the host computer 101 of printer information. The input unit 318 may be further equipped with a network controller, thereby the input unit 318 can be connected to the host computer 101 via the network. In this case, a RAM 319 functions as a main memory and a work area of the CPU 312 and the memory capacity of the RAM 319 can be expanded by an option RAM connected to an extension port not illustrated. The RAM 319 is used as an output information rasterization area, an environment data storage area, and an NVRAM (Non-Volatile RAM). Access to the external memory 314 such as the above hard disk (HD) and an IC (Integrated Circuit) card is controlled by an MC (Memory Controller) 320. The external memory 314 is connected as an option and stores font data, an emulation program, and form data. An operation panel 321 is provided with an operation switch and an LED (Light Emitting Diode) display.

Not only the single external memory 314, but also a plurality of external memories 314 may be provided. The external memory 314 may be configured so as to store an option card and a program interpreting printer control language different in a language system in addition to a built-in font. The external memory 314 may include an NVRAM (not illustrated) to store a printer mode setting information from the operation panel 321.

Figure 3A:
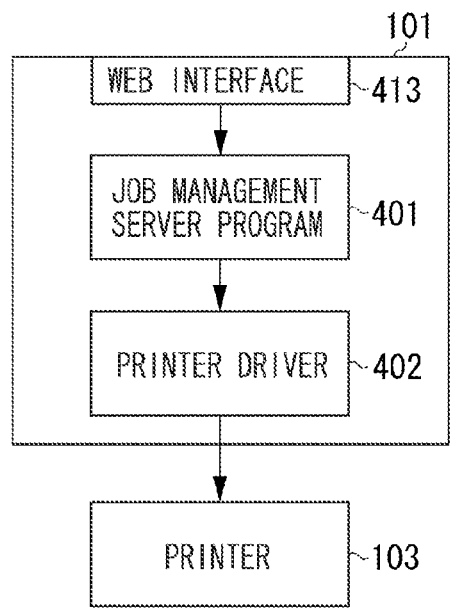
FIGS. 3A and 3B are block diagrams illustrating a configuration of software for the document processing system according to the present exemplary embodiment.
Figure 3B:
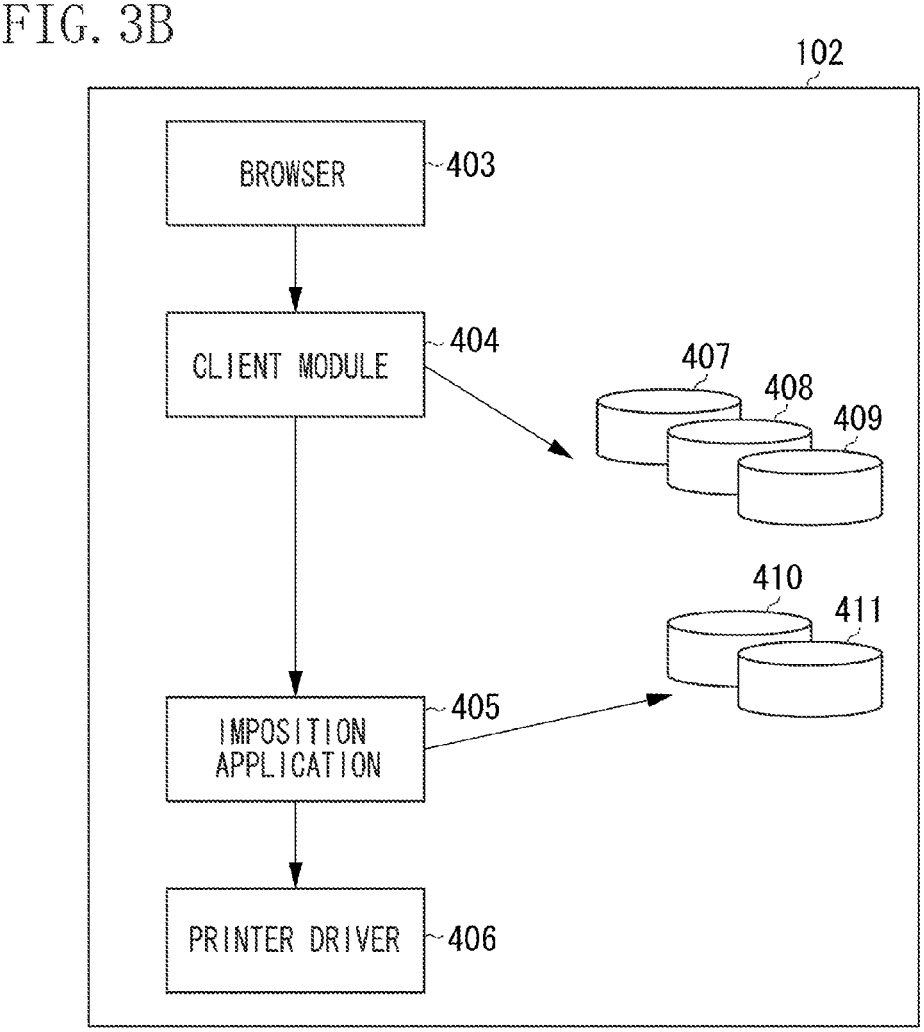

FIGS. 3A and 3B are block diagrams illustrating a configuration of software for the document processing system according to the present exemplary embodiment.

The document processing system is realized by computers 101 and 102 which are preferable exemplary embodiments of the document processing apparatus (information processing apparatus) according to the present invention.

FIG. 3A illustrates a configuration of software of the server 101. On the server 101, a job management server program 401 for setting and managing a print job and a printer driver 402 operate. And, the server 101 has a web interface 413.

The job management server program 401 provides a function of receiving a print job from the user, instructing the execution of print, and managing a print job. The job management server program 401 transmits the print job to the printer 103 via the printer driver 402.

The user can select the print job stored in the job management server program 401 and set print setting information about the type of paper to be printed and the execution of two-sided printing to the selected print job to be processed. The job management server program 401 is configured to have a GUI (Graphical User Interface) unit. The job management server program 401 can be operated from the key board 209 connected to the server 101 and also accessed and operated from the client 102, which is another computer different from the server 101 via the network. The job management server program 401 is configured to operate with the web server program, thereby the user can access the job management server program 401 operated in the server 101 from the client 102 connected to the network via the web browser. Not a general-purpose web browser, but a dedicated client application (not illustrated) is installed into the client 102 and the job management server program 401 may be operated from the client application.

FIG. 3B illustrates a configuration of software of the client 102. A web browser 403 is installed into the client 102. A client module 404 is installed to add operability and function which are not included in the standard functions of the web browser. The client module 404 is a plug-in for the web browser, acquired by download from the job management server program 401, and installed into the client 102.

An imposition application 405 is installed in the client 102. The user operates the imposition application 405 to enable the setting of detailed print setting information. The imposition application can set the print setting information, so that it is also referred to as a setting program. The client module 404 receives print document data 407, a job setting file 408, and a print setting file 409 from the job management server program 401 and stores the files in the place that can be accessed by the imposition application 405. In a cooperation mode, the imposition application 405 reads the job setting file 408 and displays the setting screen reflecting the print setting information of the job setting file 408. The job setting file 408 is used as an initial value and can be referred to as initial setting information. The imposition application can display and control a preview image based on the print document data 407 and the print setting information.

The print document data 407 is to be printed on a sheet and is a document generated by a program such as a word processor and document data computerized by a scanner from paper. For the document data generated by a word processor, if the application by which the document is generated is unavailable, the document data cannot be printed. Therefore, a PDF, which is a general-purpose data format is often used as document data.

The job setting file 408 stores information shared by the job management server program 401, the client module 404, and the imposition application 405, such as a job ID (identification information) for identifying a print job and information about the printer for performing print.

The print setting file 409 stores printing information which is set to print document data (such as two-sided printing, color printing, staple, and paper used for printing).

The imposition application 405 receives the files 407 to 409 at startup and starts with the read files. The imposition application 405 transmits print data (PS data, for example) to the printer driver 406.

The printer driver 402 is set in common as a printer server. The printer driver 406 is installed in the client 102 by using the Point and Print function of Windows®. The print job based on the print data in which the imposition application 405 instructs printing is sent to the printer driver 402 via the printer driver 406. The print job is caused to pass through the printer driver 402, thereby the print job is delivered to the server 101, so that the job management server program 401 can manage the print job. The imposition application 405 instructs printing and then stores a document file 410 including print setting information and drawing data to be printed and a status file 411 in the place that can be accessed by the client module 404.

FIG. 4 is a sequence diagram showing the outline of processing among the user, the client module 404, the job management server program 401, and the imposition application 405.

The user operates the web browser 403 operating in the client 102 and the client module 404 operating with the web browser. In the figure, both the web browser 403 and the client module 404 are dealt with as the client module 404 without distinction.

The client module 404 receives an editing instruction (501) from the user. The user selects data to be edited from a data list of a candidate to be edited, displayed on the client module 404. Alternatively, in a case where the client module 404 has a button as a GUI component for starting the imposition application 405, the user can select the button using a key board or a mouse. As a result, the client module 404 can receive data to be edited and instructions to start editing as the editing instruction 501.

The client module 404 sends an ID (identifier) for identifying the print job to be edited and a data request (502) to the job management server program 401. The job management server program 401 sends the print document data 407, the job setting file 408, and the print setting file 409 corresponding to the specified job ID to the client module 404 (503). Those data and files can be sent using an HTTP (Hypertext Transfer Protocol) or an FTP (File Transfer Protocol) communication method or a method with the use of a common file server.

The job management server program 401 sends device DB information including information about paper which can be used by the printer 103 for printing or function such as stapling (504). The device DB (database) information may be information inherent in a device, or information of a virtual device utilizing addition (OR) or product (AND) of a plurality of devices. In the case of a work flow in which a device used for actual printing is changed later or printer jobs are allocated to a plurality of devices, virtual device information can be used. In a case where the OS of the server 101 and the client 102 is Windows, the printer driver 402 is used as a printer server and the printer driver 406 can be installed using "Point & Print" function of OS. The printer driver 406 can be used as the device information DB for acquiring information about the configuration of the printer 103.

The client module 404 stores the print document data 407, the job setting file 408, and the print setting file 409 in the place that can be accessed by the print imposition application 405. Thereafter, the client module 404 starts the imposition application 405 in the cooperation mode with the job management server (505). The client module 404 sends the print document data 407, the job setting file 408, and the print setting file 409 to the imposition application 405 (506). Data in PDF (Portable Document Format) format widely used in a printing industry may be used as print document data. In addition to data in PDF format, image data in TIFF (Tagged Image File Format) and JPEG (Joint Photographic Expert Group) format or data in PS (PostScript) format may be used. The print setting information may be sent with the print document data. In this case, the imposition application 405 can be started reading in both of the print document data and the print setting information. PDF of the standard format can be used as print setting information, but a unique format may be used.

The user operates the imposition application 405 reading in the print document data (507) and sets various print setting information such as the setting of types of paper. When the user sets the print setting information, the user ends the imposition application 405 (508). The imposition application 405 having received an end message 508 issues print data to the printer driver 406 of the printer specified at startup. The print data are transmitted from the printer driver 406 to the printer driver 402, the printer driver 402 stores the print data and the job management server acquires the print data in the printer driver 402 (509). The imposition application 405 sends the document file 410 and the status file 411 acquired by editing to the client module 404 (510). The client module 404 having received the data (510) sends the received data to the job management server program 401 (511). The client module 404 notifies the job management server program 401 that the processing is ended (512).

FIG. 5 is a flow chart showing an example of processing at startup of the imposition application 405. In the present application, each step of the flow chart is realized such that the program related to the flow chart is read and executed by the CPU of the image processing apparatus.

In step 601, the imposition application 405 reads a command line parameter at startup to analyze whether a start option or an input file exists. In step 602, the imposition application 405 determines whether print document data are specified in the command line parameter read in step 601. If the print document data are specified (YES in step 602), the proceeding proceeds to step 603. If the print document data are not specified (NO in step 602), the proceeding proceeds to step 604.

In step 603, the imposition application 405 reads the print document data 407 specified by the command line parameter read in step 601. Address information of the print document data 407, the job setting file 408, and the print setting file 409 are written in the command line parameter. A URL (Uniform Resource Locator) or a file-path format can be used as the address information. The print document data 407 do not always need to be singular. A plurality of pieces of the print document data 407 may be collectively read.

In step 604, the imposition application 405 determines whether the start option (cooperation mode) is specified by the command line parameter read in step 601. If the start option is specified (i.e., if the start option is in the cooperation mode) (YES in step 604), the proceeding proceeds to step 605. If the start option is not specified (NO in step 604), the application is started.

If the start option is not in the cooperation mode, the imposition application 405 displays a screen for selecting a print setting information group at the time of starting the imposition application 405 alone and is started based on the selected print setting information group. For example, if the user selects print setting information including two-sided printing, A4-size paper, and 2in1, the imposition application 405 is started with these values set. In step 605, the imposition application 405 reads the job setting file 408. The job setting file 408 includes information about the job ID and a printer located in a place where printing is performed. In step 606, the imposition application 405 reflects the contents of the job setting file 408 read in step 605. For example, if the imposition application 405 uses the job ID as a file name, the read job ID is taken as the file name. In step 607, the imposition application 405 reads the print setting file 409. Various print setting information to be specified in the printer at the time of printing is written in the print setting file 409. The print setting information may include a color mode (monochrome or color), one-sided/two-sided, binding direction (long-side binding/short-side binding), saddle stitch On/Off, punch hole, staple ON/Off, collation, staple position, and sheet size.

In step 608, the imposition application 405 reflects the print setting information read in step 607.

In step 609, the imposition application 405 stores the type of the starting mode in preparation for the subsequent processing. The starting mode includes a normal mode in which the imposition application 405 is solely started and a cooperation mode in which the imposition application 405 is started from the client module 404 to cooperate with the job management server program 401. In step 609, the imposition application 405 stores information indicating that the imposition application 405 is started in the cooperation mode.

In step 610, the imposition application 405 stores the data folder path on which the print document data 407, the job setting file 408, and the print setting file 409 are placed, as a location on which status information is written when the imposition application 405 is ended.

In step 611, the imposition application 405 changes a GUI based on the information read at startup. A GUI to be changed includes a fixedly determined item and a dynamically changing item. An example of the fixedly determined item is a process whereby an "alias saving" menu of the imposition application 405 is disabled and fixed. In the case of a system in which the imposition application 405 cooperates with the client module 404 and a file name interlocks with a job ID, if the user changes the file name to the one that the user desires, the job ID is affected, so that the alias-saving menu needs to be disabled and fixed. Change of the fixed GUI can be performed by preparing a table and changing the GUI items written on the table.

An example of the dynamic change process of the GUI is a process whereby the configuration of the GUI is changed according to the capacity of the printer specified by the job setting file 408. The items are different according to the type of the specified printer and the capacity of the printer.

If the file name of the imposition application 405 is "iwpp-m.exe," a command line in the cooperation mode is "iwpp-m.exe/u d:¥temp." The portion of "/u" is startup option. If the startup option is specified, the imposition application 405 operates in the cooperation mode with the job management server program 401. The portion of "d:¥temp" in the command line indicates the path on which the job setting file 408 and the print setting file 409 are placed. It can be determined whether the placed file is job information or the print setting file using the extension of the file. Alternatively, information about the type of a file is written in the file, so that the type of the file may be determined based on the information.

In a case where the imposition application 405 cooperates with the client module 404 by the process of the flow chart, the imposition application 405 reads the print setting file 409 and others as initial setting at startup to allow the display of the GUI used for cooperation with the web server. Since "¥temp" is the path of the data folder on which the print document data 407, the job setting file 408, and the print setting file 409 are placed, the imposition application 405 holds "¥temp" in step 610.

Figure 6:
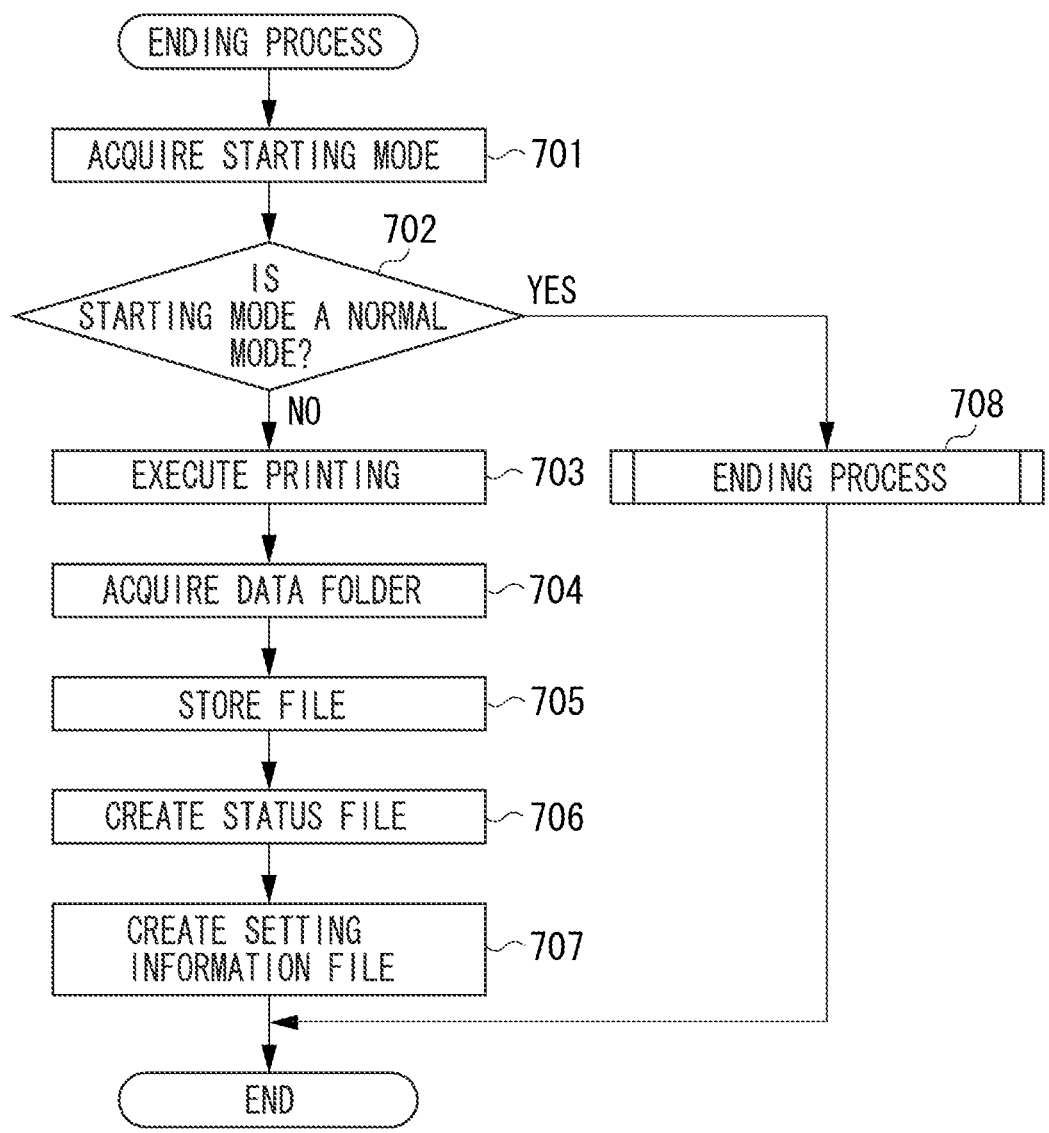
FIG. 6 is a flow chart showing an example of ending process of the imposition application.

FIG. 6 is a flow chart showing an example of ending process of the imposition application 405.

In step 701, the imposition application 405 acquires the starting mode stored in step 609. In step 702, the imposition application 405 determines whether the starting mode acquired in step 701 is the cooperation mode started by the client module 404. The determination is made by referring to the mode stored in step 609 in FIG. 5.

If the imposition application 405 determines that the starting mode is the normal mode (YES in step 702), the processing proceeds to step 708 and continues a normal ending process. The process includes the overwrite, storage, and confirmation of a file.

If the imposition application 405 determines that the starting mode is the cooperation mode (YES in step 702), the processing proceeds to step 703. The imposition application 405 instructs the printer driver 406 of the printer specified by the job setting file 408 read in step 605 to perform printing. As a result, the printer driver 406 generates a print job based on the print data generated by the imposition application 405.

In step 704, the imposition application 405 acquires the path of the data folder stored in step 610. In steps 705 and 706, the imposition application 405 stores the document file 410 and the status file 411 acquired by the editing process of the imposition application 405 in the folder of the path acquired in step 704. The files are sent to the job management server program 401 by the client module 404, associated with the print job generated in step 703, and stored. If the user instructs the print job generated in step 703 to perform again the editing process, the file stored in step 704 is used instead of the original print document data.

Information about whether the printing process is successful, a detailed error code if the printing process is unsuccessful, or a printer located in a place where printing is performed is written in the status file 411.

In step 707, the imposition application 405 creates a setting information file and stores it into the folder of the path acquired in step 704. The print setting information of the file stored in step 705 is written in the setting information file and can be used as job information read in step 607 in the subsequent process. The print setting information generated in step 707 is set by an operator who operates the imposition application 405. As an example, the operator can change setting, based on the print setting file specifying that output is performed on the A-4 size, so that the A-4 size can be obtained by arranging two-page data on the surface of an A-3 size paper and cutting the A-3 size paper. More specifically, the print setting information which the operator sets based on the print setting file is the setting information file created in step 707. The step 707 does not need to be executed.

In a case where the imposition application 405 cooperates with the client module 404 by the process of the flow chart, the imposition application 405 can perform processing (such as the execution of printing, the storage of a file, and the creation of the status file) different from a normal startup. Furthermore, in a case where the imposition application 405 cooperates with the client module 404, the imposition application 405 can generate job information reusable for the subsequent process.

Figure 7A:
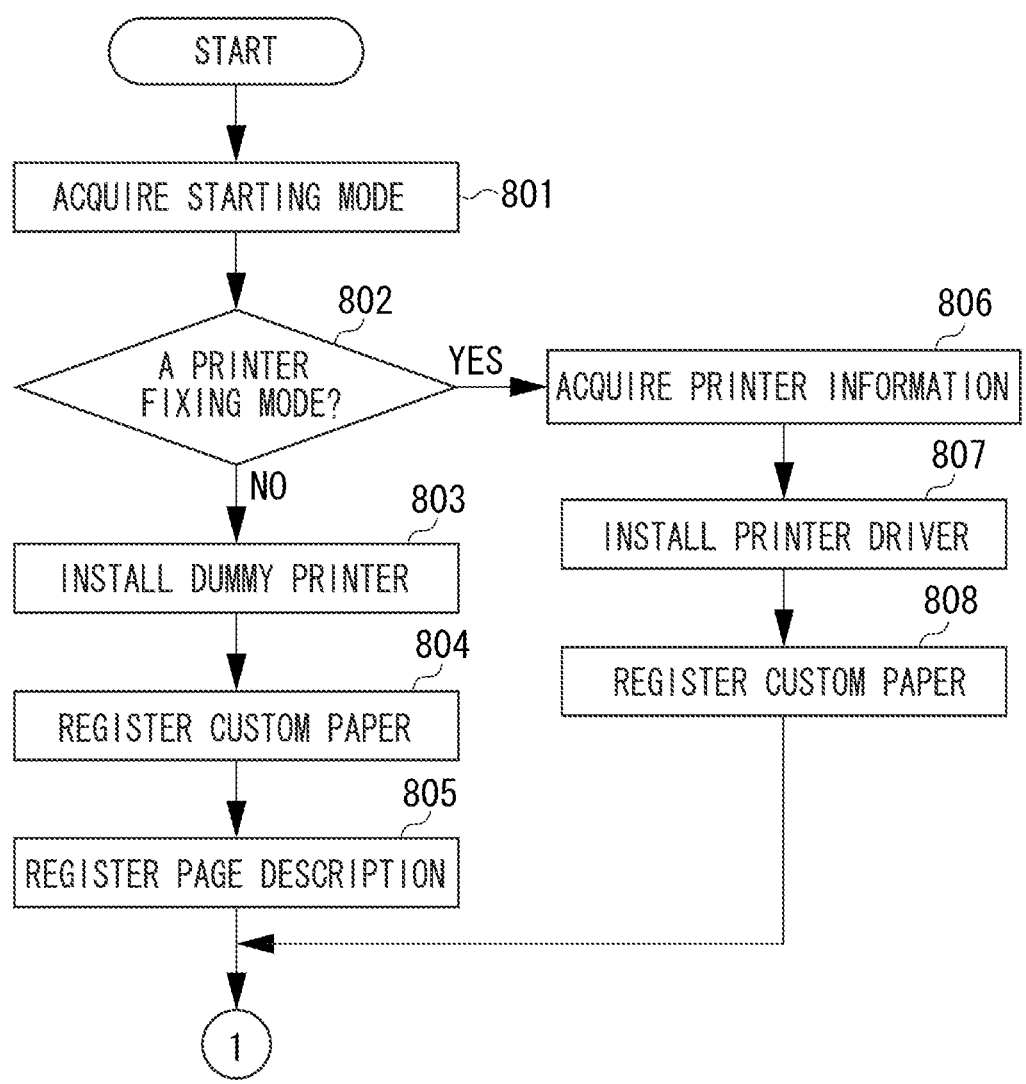
FIGS. 7A, 7B, and 7C are flow charts illustrating an example of processing for starting the imposition application.
Figure 7B:
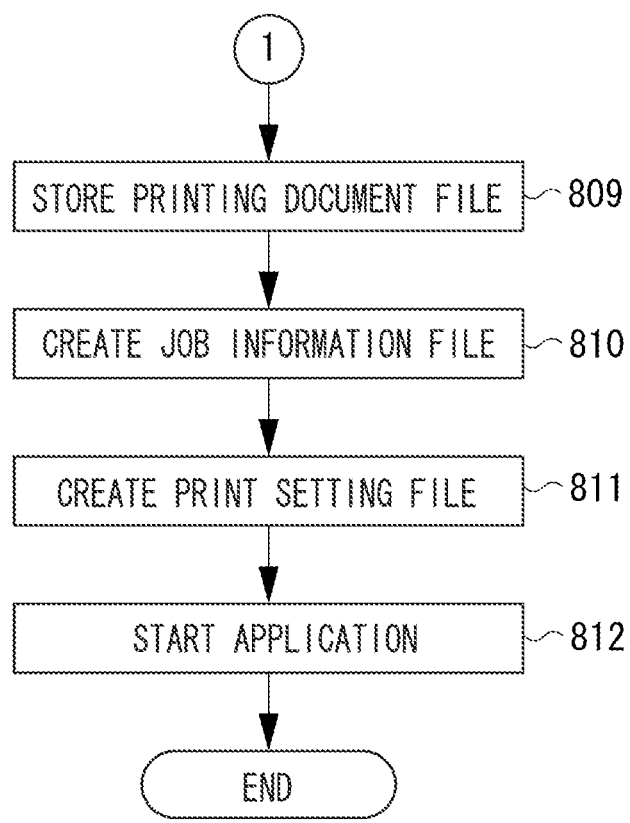
Figure 7C:
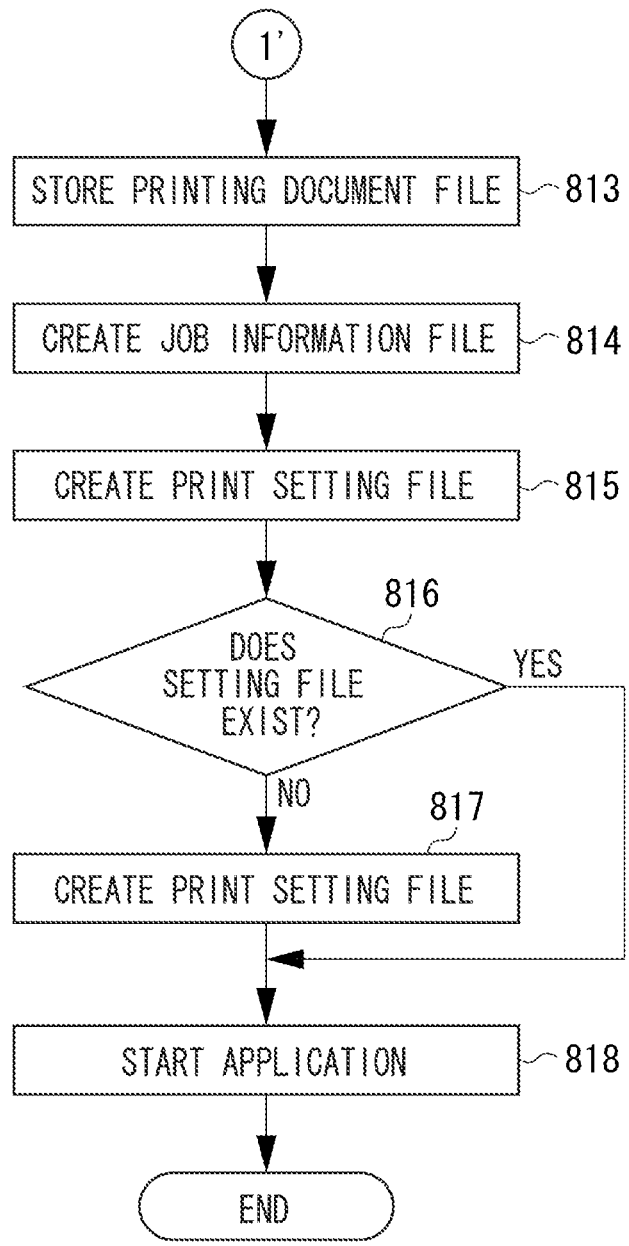

FIGS. 7A to 7C are flow charts illustrating in detail an example of processing in which the client module 404 starts the imposition application 405.

In step 801, the client module 404 acquires a starting mode in which the client module 404 starts the imposition application 405. The starting mode includes a printer fix mode and a printer change mode. The former is a mode in which a printer located in a place where printing is performed and recognized by the imposition application 405 is not changed. In the printer fix mode, a printer to be used can be identified, so that the print setting information can be set according to the capacity of the printer. For the latter, the printer can be changed using the UI (User Interface) of the client module 404 after the editing of an image editing application 405. It is possible that the printing is performed in the printer in which not all functions thereof used for printing can be used, or the print setting information set by the imposition application 405 cannot be realized. In step 802, the client module 404 determines whether the printer mode acquired in step 801 is the printer fix mode. If the client module 404 determines that the printer mode is the printer fix mode (YES in step 802), the proceeding proceeds to step 806. If the client module 404 determines that the printer mode is the printer change mode (NO in step 802), the proceeding proceeds to step 803.

In step 803, the client module 404 installs a dummy printer driver. The dummy printer driver is transferred from the job management server program 401 to the client module 404. The dummy printer driver acquires only a common capacity between usable printers and receives only setting related to the common capacity. Alternatively, the dummy printer driver acquires the sum of capacities of usable printers and receives setting related to the sum of capacities. The dummy printer driver may acquire only the common capacity, the sum of capacities, or a mixture of the common capacity and the sum of capacities, depending on function.

In step 804, the client module 404 registers a custom sheet on the client 102. The term "custom sheet" refers not to a standard sheet such as A4 or letter, but to a sheet of any size. Thereby, the custom sheet can be set to the dummy printer driver installed in step 803.

In step 805, the client module 404 registers information about page description on the client 102. This allows the information about page description to be used from the dummy printer installed in step 803. The term "information about page description" refers to information about a physical attribute of a sheet such as thickness (weighting), surface nature, and color and information used for specifying paper to be supplied to a printer.

In step 806, the client module 404 acquires information about a printer used for printing specified by the user. The information is delivered by the job management server program 401. In step 807, the client module 404 installs the printer driver of the printer acquired in step 806. In step 808, the client module 404 registers the custom sheet in the client 102 as is the case with step 804.

In step 809, the client module 404 stores the print document data 407 delivered by the job management server program 401 in the place that can be accessed by the imposition application 405. In step 810, the client module 404 creates the job setting file 408 based on the information delivered by the job management server program 401 and stores the job setting file 408 in the place that can be accessed by the imposition application 405.

In step 811, the client module 404 stores the print setting file 409 delivered by the job management server program 401 in the place that can be accessed by the imposition application 405. In step 812, the client module 404 starts the imposition application 405 with the files stored in steps 809, 810, and 811 as starting parameters.

FIG. 7B is a flow chart illustrating an example of a process with which step 809 and the subsequent steps can be replaced.

Steps 813 to 815 are similar to steps 809 to 811. In step 816, the client module 404 determines whether the print setting file stored by the imposition application 405 in step 707 is delivered from the job management server program 401. If the print setting file 409 created by the operator exists (YES in step 816), the processing of the client module 404 proceeds to step 818.

In step 817, the print setting file 409 created by the operator is stored in the place that can be accessed by the imposition application 405.

In step 818, the client module 404 starts the imposition application 405 with the stored print document data 407, the job setting file 408, and the print setting file 409 as the starting parameters.

By the process of the flow chart, the client module 404 allows the client 102 to use information about the printer driver, the custom sheet, and the page description which are managed by the job management server program 401 in the server 101. This enables the imposition application 405 to share information about the custom sheet and the like with the job management server program 401.

FIGS. 8A and 8B illustrate examples of the job setting file 408 and the contents 900 thereof. The job setting file 408 is in the XML (eXtensible Markup Language) format. FIG. 8A indicates that the job setting file 408 includes the information 901 of the printer, "ModelName" is a printer name for identifying the printer 103, and "1" of "PrinterType" is the printer fix mode. The job setting file 408 includes the information 902 for identifying the print setting file 409. The file name of the print setting file 409 is written in "Name." The job setting file 408 includes the information 903 for identifying the print document data 407. "Type" is a file format. "Name" is a file name of the print document data 407. In the example, a file in the PDF format is specified as the print document data 407.

FIG. 8B is another example of the job setting file 408. The job setting file 408 includes the information 904 of the printer. "2" specified as "PrinterType" indicates the printer change mode. "IWD" of a file format 905 is a file format peculiar to the imposition application 405. Since the file in the IWD format includes print setting and document data, it includes only one file.

FIGS. 9A to 9C illustrate examples of the status file 411 and the contents 1000 thereof. The status file 411 is in the XML format. FIG. 9A illustrates an example of a case where an image application is normally ended. Information 1001 about the document file stored by the imposition application 405 is written in the status file 411. The example in FIG. 9A shows that a file in "IWD" format which is the file format peculiar to the imposition application 405 is stored.

The status file 411 includes status information 1002 about processing, in which a status code "0" indicating the normal end is written in the example of FIG. 9A. The client module 404 and the job management server program 401 can determine whether the imposition application 405 has normally ended the processing or failed, based on the value of the status code.

FIG. 9B illustrates an example in a case where the imposition application 405 has ended without storing the document file. Because the document file is not stored, the file corresponding to the information 1001 of the document file in FIG. 9A is not written and only "2000" of a return code 1003 is written.

FIG. 9C illustrates an example in a case where an error occurs. Since the document file does not exist when the error occurs, "−1010" of a negative error code indicating an error is written on a return code 1004.

Although the example of the print setting file 409 is not illustrated, designation about printing such as the type of color mode (color/monochrome printing), a printing method, saddle stitch binding, staple setting, sheet size, name of sheet, and a paper feed unit can be written in the print setting file 409. The print setting information can include the setting of perfect binding and cutting, for example, in addition to the above information.

The imposition application 405 reads the print setting file 409 at startup to acquire information about the capacity of the printer 103 from the printer driver 406. If the function that cannot be realized by the printer 103 is written in the print setting file 409 when both are compared with each other, the imposition application 405 can notify the user that there is an item that cannot be set.

Figure 10:
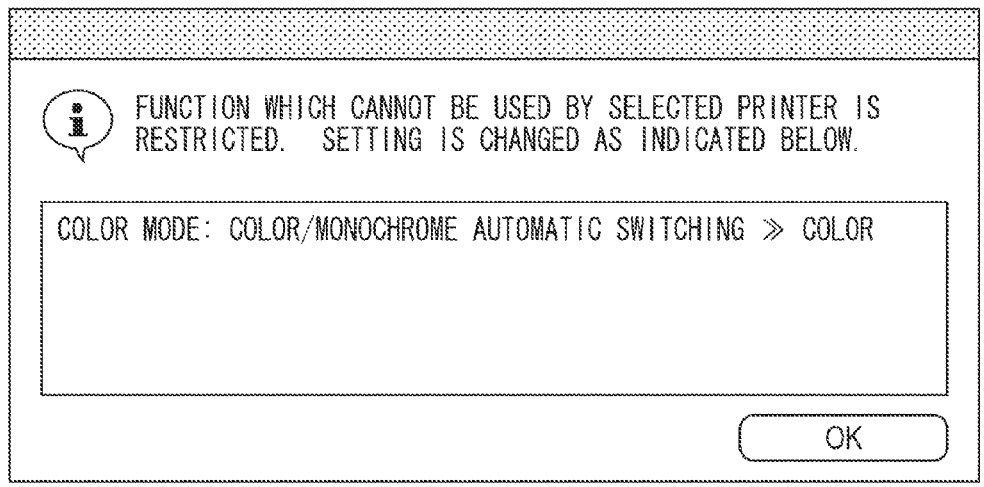
FIG. 10 is an example of a message displayed by the imposition application.

FIG. 10 is an example of a message displayed by the imposition application 405. The example illustrates a message to be displayed in a case where the print setting file 409 is instructed to switch between color and monochrome setting for each page because the printer is incompatible with color/monochrome automatic switching. In other words, the example shows that processing is continued by changing the setting for switching in every page to the setting for printing all pages in color.

Figure 11:
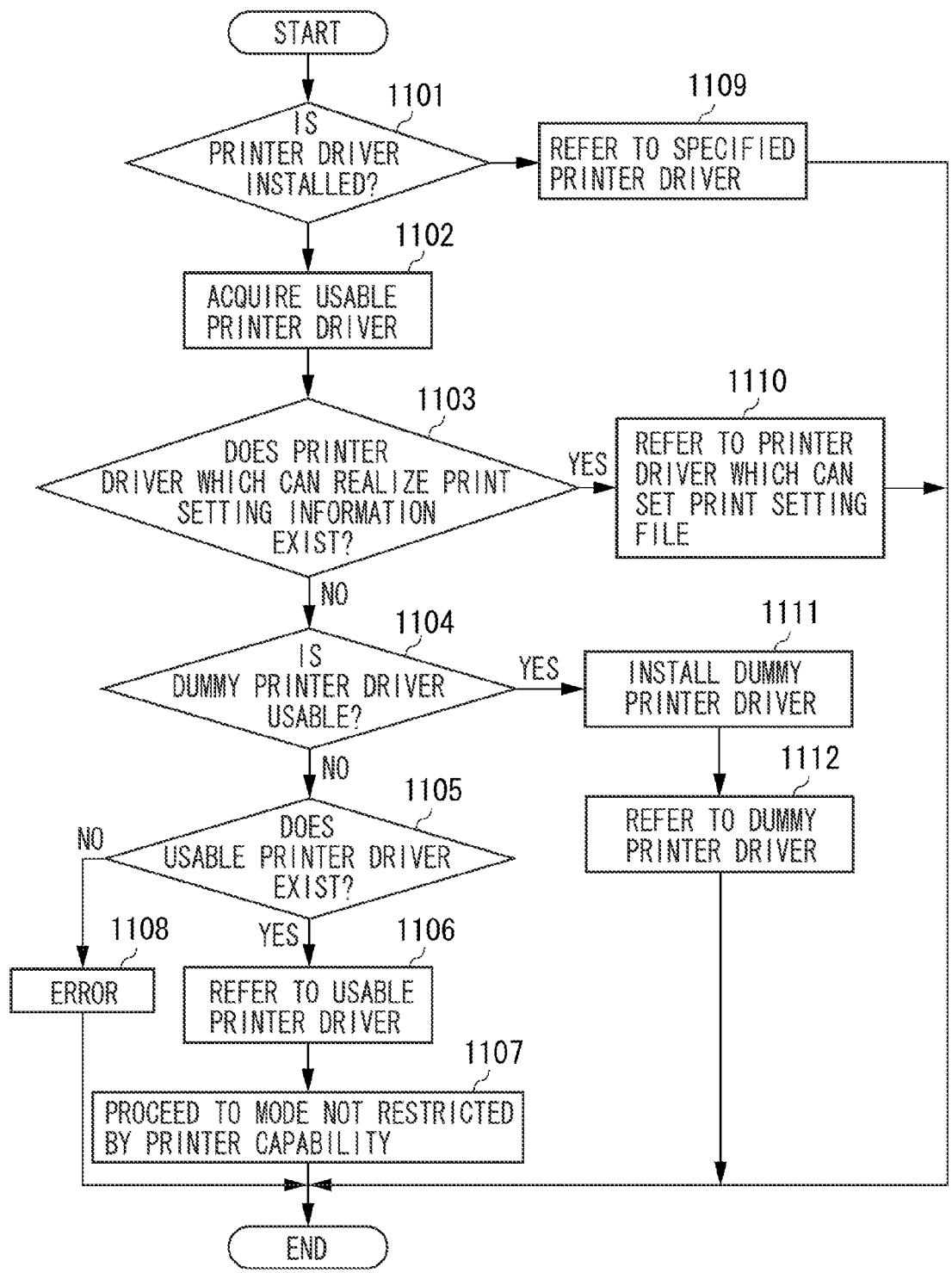
FIG. 11 is a flow chart illustrating an example of processing in a case where reference to a printer cannot be made.

FIG. 11 is a flow chart illustrating an example of processing of the imposition application 405 in a case where the client module 404 fails in installing the printer driver in steps 803 and 807, and cannot refer to the printer specified by the job setting file 408. The client module 404 fails in installing the printer driver if the printer driver is being used by another program, for example.

In step 1101, the imposition application 405 determines whether the printer driver of the printer specified in the job setting file 408 is installed in the client 102. If the printer driver is installed (YES in step 1101), the processing proceeds to step 1109. If the printer driver is not installed (NO in step 1102), the processing proceeds to step 1102. In step 1102, the imposition application 405 acquires all printer drivers installed in the client 102. In step 1103, the imposition application 405 determines whether there is the printer that can realize the print setting information specified in the print setting file 409. In step 1103, the imposition application 405 compares the capacities of all printers installed in the client 102 and acquired in step 1102 with the print setting information specified in the print setting file 409. If the imposition application 405 determines that all printer drivers installed in the client 102 cannot realize the print setting information in the print setting file 409 (NO in step 1103), the processing proceeds to step 1104. If the imposition application 405 determines that there is the printer that can realize the print setting information in the print setting file 409 among the printer drivers installed in the client 102 (YES in step 1103), the processing proceeds to step 1110.

In step 1104, the imposition application 405 determines whether the dummy printer driver is available. More specifically, a determination is made as to whether the web server registers the dummy printer driver in the client 102 before the startup of the imposition application 405. If the web server registers the dummy printer driver in the client 102 before startup (YES in step 1104), the imposition application 405 determines that the dummy printer driver is available, and the proceeding advances to step 1111. If the web server does not register the dummy printer driver in the client 102 before startup (NO in step 1104), the imposition application 405 determines that the dummy printer driver is unavailable, and the proceeding advances to step 1105.

In step 1105, the imposition application 405 determines whether at least one printer driver can be acquired in step 1102. If there is at least one available printer driver (YES in step 1105), the proceeding advances to step 1106. If there is no available printer driver (NO in step 1105), the proceeding advances to step 1108. In step 1106, the imposition application 405 sets any one of the printer drivers acquired in step 1102 as a reference printer driver. If a plurality of the printer drivers is available, the imposition application 405 may select a printer driver in the order of printer names, for example, independently of the capacity of the printer driver or the printer that can realize a larger number of the settings specified in the print setting file 409. In step 1107, the imposition application 405 proceeds to the mode, which operates without restriction by printer capacity.

In step 1108, there is no available printer, so that the imposition application 405 ends an error processing.

In step 1109, the imposition application 405 refers to the printer specified in the job setting file 408.

In step 1110, the imposition application 405 refers to the printer that can realize the setting of the print setting file 409 determined in step 1103. If a plurality of printer drivers can realize the setting of the print setting file 409, a printer may be selected in consideration of the operating rate of the printer or status of consumables. More simply, the imposition application 405 may select the printer driver first determined as a driver which can realize the setting of the print setting file 409.

In step 1111, the imposition application 405 starts the installer of the dummy printer driver to install the dummy printer. In step 1112, the imposition application 405 refers to the dummy printer driver installed in step 1111. If the dummy printer driver is instructed to print, the print job based on print data is sent from the printer driver 406 (the dummy printer driver in this case) to the printer driver 402. The job management server program 401 determines a printer that actually executes printing.

The process of the flow chart allows the start of the imposition application 405 to perform the print setting, by executing the printing process even if the client module 404 fails in installing the printer driver in steps 803 and 807.

In the document processing method for performing a print setting (such as sheet setting and two-sided setting) in cooperation with the job management server, not only a GUI can be controlled, but also initial values required for collaboration (such as a job ID, print setting, and an output printer) can be read and a program can be started reflecting the setting. Furthermore, the method permits not only the processing at startup, but also performing the processing peculiar to cooperation processing in which the cooperation is performed at the end of the application.

Other Embodiments

Aspects of the present invention can also be realized by a computer of a system or apparatus (or devices such as a CPU, a micro-processing unit (MPU), and/or the like) that reads out and executes a program recorded on a memory device to perform the functions of the above-described embodiment(s), and by a method, the steps of which are performed by a computer of a system or apparatus by, for example, reading out and executing a program m recorded on a memory device to perform the functions of the above-described embodiment(s). For this purpose, the program is provided to the computer for example via a network or from a recording medium of various types serving as the memory device (e.g., a computer-readable medium).

An embodiment of the present invention can provide an information processing apparatus which can communicate with a server (101) for managing document data (407) and stores a setting program for setting print setting information to the document data (407), the information processing apparatus comprising: a determination means configured to determine whether the starting mode of the setting program is a cooperation mode for processing the document data (407) stored in the server (101); and a control means configured to operate in a state where the name of the document data (407) cannot be changed if the determination means determines that the starting mode is the cooperation mode and to operate in a state where the name of the document data (407) can be changed if the determination means determines that the starting mode is not the cooperation mode.

Preferably, for such an information processing apparatus, if the determination means determines that the starting mode is the cooperation mode, the display control means reads print document data (407) of a print job to be processed to display the preview image of the read print document data (407).

Preferably, such an information processing apparatus further comprises a change means configured to change the initial setting information of the print job according to instructions received via a setting screen provided by the setting program if the determination means determines that the starting mode is the cooperation mode.

Preferably, the setting program further comprises an output means configured to output print data when the setting program is ended.

Another embodiment of the invention can provide a control method executed in an information processing apparatus which can communicate with a server (101) for managing document data (407) and stores a setting program for setting print setting information in the document data (407), the control method comprising: determining whether the starting mode of the setting program is a cooperation mode for processing the document data (407) stored in the server (101); and controlling an operation in a state where the name of the document data (407) cannot be changed if it is determined that the starting mode is the cooperation mode, and controlling the operation in a state where the name of the document data (407) can be changed if it is determined that the starting mode is not the cooperation mode.

Preferably, in such a method, if it is determined that the starting mode is the cooperation mode, the display control reads print document data (407) of a print job to be processed to display the preview image of the read print document data (407).

Preferably, the method further comprises changing the initial setting information of the print job according to instructions received via a setting screen provided by the setting program if it is determined that the starting mode is the cooperation mode.

Preferably, the setting program further comprises outputting print data when the setting program is ended.

A further embodiment of the invention can provide a storage medium storing a program for executing a control method executed in an information processing apparatus which can communicate with a server (101) for managing document data (407) and stores a setting program for setting print setting information to the document data (407), the control method comprising: determining whether the starting mode of the setting program is a cooperation mode for processing the document data (407) stored in the server (101); and controlling an operation in a state where the name of the document data (407) cannot be changed if it is determined that the starting mode is the cooperation mode, and controlling the operation in a state where the name of the document data (407) can be changed if it is determined that the starting mode is not the cooperation mode.

Preferably, for such a storage medium storing a setting program, if it is determined that the starting mode is the cooperation mode, the display control reads print document data (407) of a print job to be processed to display the preview image of the read print document data (407).

Preferably, for such a storage medium storing a program for executing a control method, the control method further comprises changing the initial setting information of the print job according to instructions received via a setting screen provided by the setting program if it is determined that the starting mode is the cooperation mode.

Preferably, for such a storage medium storing a program, the setting program further comprises outputting print data when the setting program is ended.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-113559 filed May 17, 2010, which is hereby incorporated by reference herein in its entirety.

What is claimed is:

1. An information processing apparatus which can communicate with a server for managing document data and store a setting program for setting print setting information to the document data, the information processing apparatus comprising:
   a determination unit configured to determine whether a starting mode of the setting program is a cooperation mode for processing the document data stored in the server;
   a control unit configured to operate in a state where a name of the document data cannot be changed after the determination unit determines that the starting mode is the cooperation mode and to operate in a state where the name of the document data can be changed after the determination unit determines that the starting mode is not the cooperation mode;
   a GUI (Graphical User Interface) change unit configured to change a GUI to be displayed according to a function of a printing apparatus designated by the server after the determination unit determines that the starting mode is the cooperation mode; and
   a display control unit configured to display the GUI changed by the GUI change unit.

2. The information processing apparatus according to claim 1, wherein, if the determination unit determines that the starting mode is the cooperation mode, a display control unit reads print document data of a print job to be processed to display a preview image of the read print document data.

3. The information processing apparatus according to claim 1, further comprising a change unit configured to change initial setting information of the print job according to instructions received via a setting screen provided by the setting program, if the determination unit determines that the starting mode is the cooperation mode.

4. The information processing apparatus according to claim 1, wherein the setting program further comprises an output unit configured to output print data when the setting program is ended.

5. A control method executed in an information processing apparatus which can communicate with a server for managing document data and store a setting program for setting print setting information in the document data, the control method comprising:
- determining whether a starting mode of the setting program is a cooperation mode for processing the document data stored in the server;
- controlling an operation in a state where a name of the document data cannot be changed after it is determined that the starting mode is the cooperation mode, and controlling the operation in a state where the name of the document data can be changed after it is determined that the starting mode is not the cooperation model;
- changing a GUI (Graphical User Interface) to be displayed according to a function of a printing apparatus designated by the server after the starting mode is determined to be the cooperation mode; and
- displaying the changed GUI.

6. The control method according to claim 5, wherein, if it is determined that the starting mode is the cooperation mode, a display control reads print document data of a print job to be processed to display a preview image of the read print document data.

7. The control method according to claim 5, further comprising changing initial setting information of the print job according to instructions received via a setting screen provided by the setting program if it is determined that the starting mode is the cooperation mode.

8. The control method according to claim 5, wherein the setting program further comprises outputting print data when the setting program is ended.

9. A non-transitory storage medium storing a program for executing a control method executed in an information processing apparatus which can communicate with a server for managing document data and store a setting program for setting print setting information to the document data, the control method comprising:
- determining whether a starting mode of the setting program is a cooperation mode for processing the document data stored in the server;
- controlling an operation in a state where a name of the document data cannot be changed after it is determined that the starting mode is the cooperation mode, and controlling the operation in a state where the name of the document data can be changed after it is determined that the starting mode is not the cooperation model;
- changing a GUI (Graphical User Interface) to be displayed according to a function of a printing apparatus designated by the server after the starting mode is determined to be the cooperation mode; and
- displaying the changed GUI.

10. The non-transitory storage medium according to claim 9, wherein, if it is determined that the starting mode is the cooperation mode, a display control reads print document data of a print job to be processed to display a preview image of the read print document data.

11. The non-transitory storage medium according to claim 9, further comprising changing initial setting information of the print job according to instructions received via a setting screen provided by the setting program if it is determined that the starting mode is the cooperation mode.

12. The non-transitory storage medium according to claim 9, wherein the setting program further comprises outputting print data when the setting program is ended.

* * * * *